United States Patent

Catanzarite et al.

[11] Patent Number: 5,964,455
[45] Date of Patent: Oct. 12, 1999

[54] METHOD FOR AUTO-CALIBRATION OF A CONTROLLABLE DAMPER SUSPENSION SYSTEM

[75] Inventors: David M. Catanzarite, Edinboro, Pa.; David J. Hamo, Cary; John C. Holzheimer, Fuquay-Varina, both of N.C.

[73] Assignee: Lord Corporation, Cary, N.C.

[21] Appl. No.: 08/874,364

[22] Filed: Jun. 13, 1997

[51] Int. Cl.$^6$ ....................................................... F16F 1/00
[52] U.S. Cl. .......................... 267/131; 248/550; 267/136
[58] Field of Search ................................ 267/132, 136, 267/131; 248/550; 73/1.71, 1.79, 1.88, 11.04

[56] References Cited

U.S. PATENT DOCUMENTS

| | | | |
|---|---|---|---|
| 4,761,608 | 8/1988 | Franklin et al. | 324/202 |
| 4,826,205 | 5/1989 | Kouda et al. | 280/703 |
| 5,018,606 | 5/1991 | Carlson | 188/267 |
| 5,031,934 | 7/1991 | Soltis | 280/840 |
| 5,142,897 | 9/1992 | Pischke et al. | 73/1 J |
| 5,169,112 | 12/1992 | Boyles et al. | 248/550 |
| 5,276,623 | 1/1994 | Wolfe | 364/424.05 |
| 5,277,281 | 1/1994 | Carlson et al. | 188/267 |
| 5,284,330 | 2/1994 | Carlson et al. | 267/140.14 |
| 5,346,170 | 9/1994 | Schmidt et al. | 248/550 |
| 5,358,305 | 10/1994 | Kaneko et al. | 296/65.1 |
| 5,461,564 | 10/1995 | Collins et al. | 364/424.05 |
| 5,522,481 | 6/1996 | Watanabe | 188/267 |
| 5,582,385 | 12/1996 | Boyle et al. | 248/550 |
| 5,652,704 | 7/1997 | Catanzarite | 364/424.059 |
| 5,665,896 | 9/1997 | McMurtry | 73/1.75 |
| 5,712,783 | 1/1998 | Catanzarite | 364/424.046 |

FOREIGN PATENT DOCUMENTS

| | | |
|---|---|---|
| 0 534 645 A1 | 3/1993 | European Pat. Off. . |
| 0 544 484 A2 | 6/1993 | European Pat. Off. . |
| 08258520 | 10/1996 | Japan . |

*Primary Examiner*—Robert J. Oberleitner
*Assistant Examiner*—Thomas J. Williams
*Attorney, Agent, or Firm*—Randall S. Wayland

[57] ABSTRACT

A method for automatically calibrating a controller (44) for a controllable damping system (40), for example, the suspension and damping system for a truck seat or cab, includes the steps of receiving a initiation signal that is checked against criteria to ensure that calibration is actually intended. The seat (20) or other body (ex. a vehicle cab) is then moved to a first limit position, where a sensor (50, 50') reads a position signal, and to a second limit position, where another position signal is read. Preferably, a midpoint, or neutral position is calculated from the measured position signals, and the seat (20) or other body is moved to this neutral position. A range of movement is determined from the first and second position signals. Preferably, end stop limits are calculated as predetermined fractions of the range of movement value. All values are stored for use by the controllable damper system (40).

21 Claims, 3 Drawing Sheets

METHOD FOR AUTO-CALIBRATION OF A CONTROLLABLE DAMPER SUSPENSION SYSTEM

The invention relates to a controllable damper system, and more particularly, to a method for automatically determining the operating parameters for a controllable damper system.

BACKGROUND AND SUMMARY OF THE INVENTION

Controllable damper systems have been proposed for a number of applications, including trucks, off-highway equipment, construction equipment, and automotive. Controllable dampers can provide continuous adjustment of the output force over a significant range, as opposed to passive systems which have unchangeable operating characteristics. Controllable fluid dampers, which are available in various types, are particularly advantageous because of the extremely fast response time. U.S. Pat. No. 5,277,281 to Carlson et al. which discloses a magnetorheological fluid damper. An electrophoretic fluid damper is disclosed in U.S. Pat. No. 5,018,606 to Carlson. U.S. Pat. No. 5,522,481 to Watanabe discloses an electrorheological fluid damper. These type dampers are controlled by changing the electric or magnetic field applied to a fluid whose apparent viscosity is responsive to the field.

One advantageous use for controllable dampers is in secondary suspension systems, for example, suspension systems for vehicle seats or cabs. Isolating the seat or cab from the vehicle frame to protect the operator from vibrations transmitted through the vehicle can improve the operator's ability to control the vehicle and may reduce vibrations experienced by the operator.

Commonly owned U.S. Pat. Nos. 5,652,704, entitled "Controllable Seat Damper System and Control Method Therefor" and 5,712,793, entitled "Control Method For Semi-Active Damper" disclose systems using a controllable fluid damper such as a magnetorheological (MR) type, in combination with vehicle suspension systems. In such a system, for example a seat suspension system, the system actively controls damping by sensing the seat position and the rate of change of the seat position and calculates an appropriate damping force based on a stored algorithm.

To install and operate controllable damper systems the kinematic parameters of the suspension system must be supplied to the control system. The parameters include, for example, the movement limits of the supported body (the maximum upper and lower positions) and the end stop limits (the positions at which increased damping is used to avoid sudden collision with a maximum or minimum position). These parameters are different for different suspension systems, for example, seats from different manufacturers.

The problem of determining the kinematic parameters is compounded for the installation of a controllable damper system in an existing vehicle. In addition to variations in the seat and suspension components, additional variations may be introduced by the person doing the installation of the damper system due to positioning of the sensors, and the like.

Any of these factors, in original or retrofit systems, can skew the expected values of the kinematic parameters. Controllable damper systems have accordingly, until now, required individual, manual calibration.

The present invention provides a method for the automatic calibration of a controllable damper system that avoids the problems of variation in suspension kinematics and facilitates damper system setup. The method according to the invention automatically performs steps to determine the positional parameters and preferably also calculates the end stop and other parameters. These values are stored for use by the damping control system.

The invention also allows for the re-calibration of an installed system, which may be needed when field parameters change, for example, after a repair is made to the suspension structure or the controllable damper system is switched to a new seat.

The method is particularly advantageous for damper systems as described in U.S. Pat. No. 5,652,704, and U.S. Pat. No. 5,712,783, the disclosures of which are incorporated herein by reference. In particular, the description below discusses a seat for a truck, however, the method of the invention may be employed with other controllable damping systems for other structures, such as with suspended vehicle cabs, and the like. The description herein is not meant to limit the invention to a truck seat damper.

According to the method of the invention, an initiation signal is received, which causes the calibration routine to activate. The system first checks that the initiation signal meets set criteria to confirm that calibration is intended. If the signal does not meet the criteria, the system takes default values or the last stored values for use by the damping control system. If the signal does meet the criteria, the system begins by automatically moving the seat first to a first position (preferably the upper maximum seat height position) and obtaining a first (upper) limit signal from a position sensor for that seat height position. The seat is then moved to a second position (preferably, the bottom minimum seat height position), and a second (lower) limit position signal is similarly obtained. From these two signal values, a position range may be calculated as an arithmetic difference between the values. Additionally, a center or neutral position value may also be determined, and the seat optionally may be moved to that position. The neutral position represents a preferred set position for the seat.

The system preferably also calculates end stop limits, which are position ranges near the extreme seat positions. The end stops are used as triggers to increase the damping to prevent the seat from colliding with the suspension structure at the end of the range of motion or bottoming out of the damper itself. The end stops are preferably calculated as a percentage of the complete range of motion, and for a truck seat, for example, may be set at 30% for the upper limit and 20% for the lower limit. The end stops are also used to limit the range of leveling available to the user for positioning the seat. Optionally, the end stops may be predetermined values.

The values measured and calculated by the system are stored for use by the damping control system, which completes the calibration routine.

BRIEF DESCRIPTION OF THE DRAWINGS

The invention will become better understood by reference to the description that follows, in conjunction with the appended drawings, in which.

DETAILED DESCRIPTION OF THE PREFERRED EMBODIMENT

Figure 1:
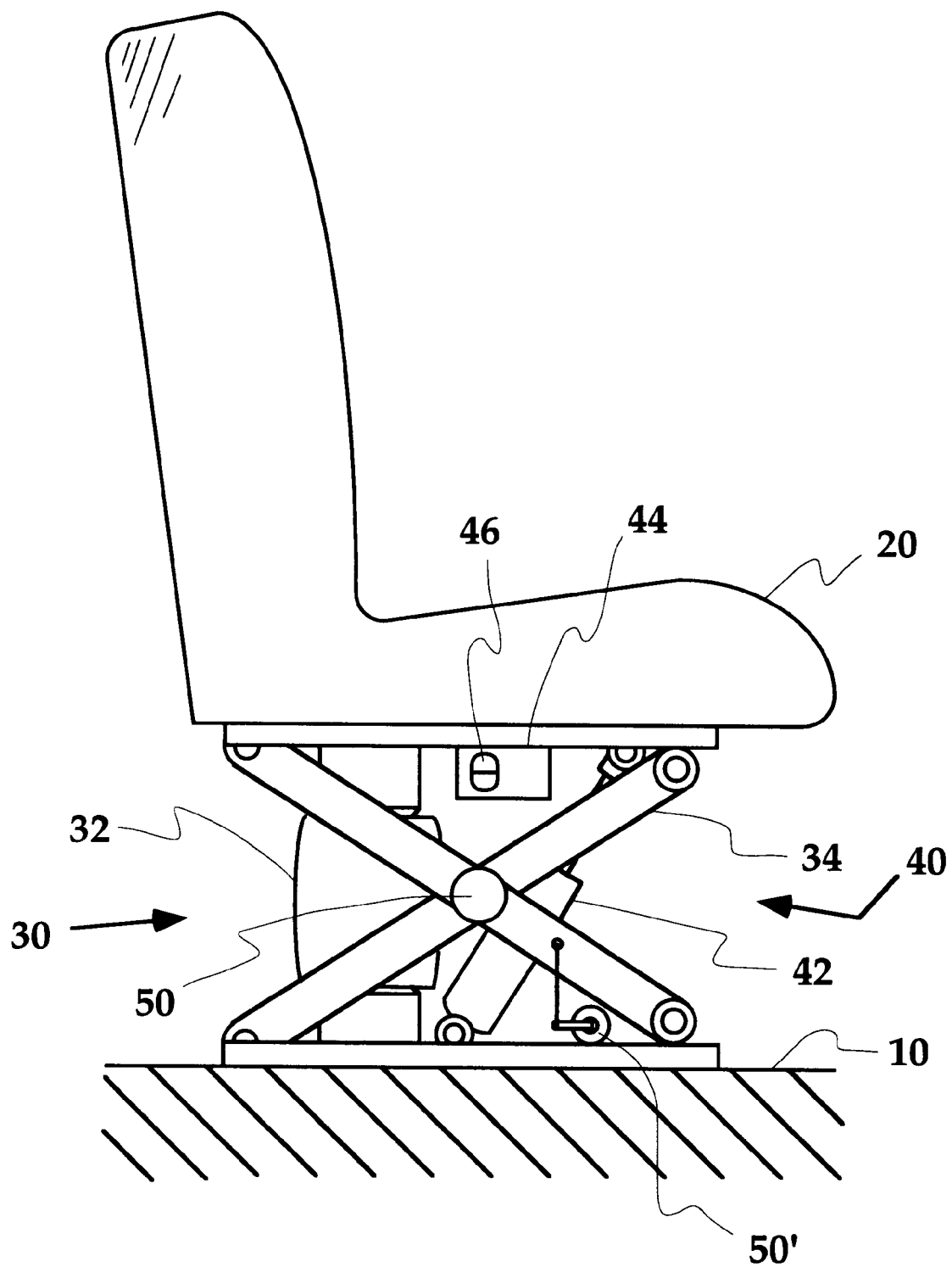
FIG. 1 is a schematic side view of a controllable seat suspension system with which the present invention may be used.

A controllable seat suspension system with which the calibration method of the invention may be used is schematically illustrated in FIG. 1. The illustrated seat and suspension system are similar to those disclosed in U.S. Pat. Nos. 5,652,704, and 5,712,783, the disclosures of which are incorporated herein by reference. Although the invention is described below in terms of a specific seat suspension system, it will be appreciated that the invention may be used in connection with any controllable damper system, and the following description is meant to be illustrative rather than limiting.

The controllable suspension system includes a suspended body 20, which can be a seat or a vehicle cab, for example, mounted to a frame 10, which accordingly can be a floor of a cab or the structural frame of a vehicle. For purposes of the illustration and description, the frame 10 is a part of a vehicle (a truck, an off-road vehicle, or construction apparatus, for example), and the body is a seat 20 for an operator. A suspension system 30 isolates the body 20 from vibrations of the frame 10. The suspension system 30 includes a spring 32 and a support 34. The spring 32 in the illustrated embodiment is an air spring, which can be adjusted by use of an air source and valve (not illustrated). The support 34 is illustrated as a scissors mount, but other types of support devices which allow vertical movement and restrain horizontal movement may be used as convenient.

A controllable damper system 40 is connected in parallel relationship with the spring 32 and support 34 to isolate the body 20 from vibrations of the frame 10. The controllable damper system 40 includes a damper 42 operably mounted to a bracket which mounts to the frame 10 and the body 20. Alternatively, the damper 42 could be mounted between the frame and the scissors mount or between the various scissors components. The damper 42 may be a controllable fluid damper as disclosed by U.S. Pat. No. 5,277,281, U.S. Pat. No. 5,018,606, or U.S. Pat. No. 5,522,481.

A position sensor 50 is preferably mounted at the axis of the scissors support 34 to detect the position of the seat 20. Alternatively, the position sensor could be mounted between any two relatively moving suspension components, as is shown by sensor 50' at an optional location between the base 10 and a leg of the scissors. The displacement of the seat can obtained by comparison of position data taken over time. The position sensor 50 may conveniently be a variable resistor which produces a range of voltages corresponding to a range of seat positions, such as a potentiometer. A Hall effect sensor could also be used. The damper system 40 includes a controller 44, which is shown mounted to the bottom of the seat 20 for convenient access by the operator, but could be mounted on other suitable structures. A seat leveling switch 46 interconnected to the controller 44 allows manual selection of the vertical position of the seat.

As will be appreciated, the seat 20 can move through a range of height positions, from a bottom position to an upper position as permitted by the scissors support 34 or the damper stroke. The controller 44 in conjunction with the leveling switch 46 is used to change the pressure in the air spring 32 to adjust the seat height position.

Figure 2:
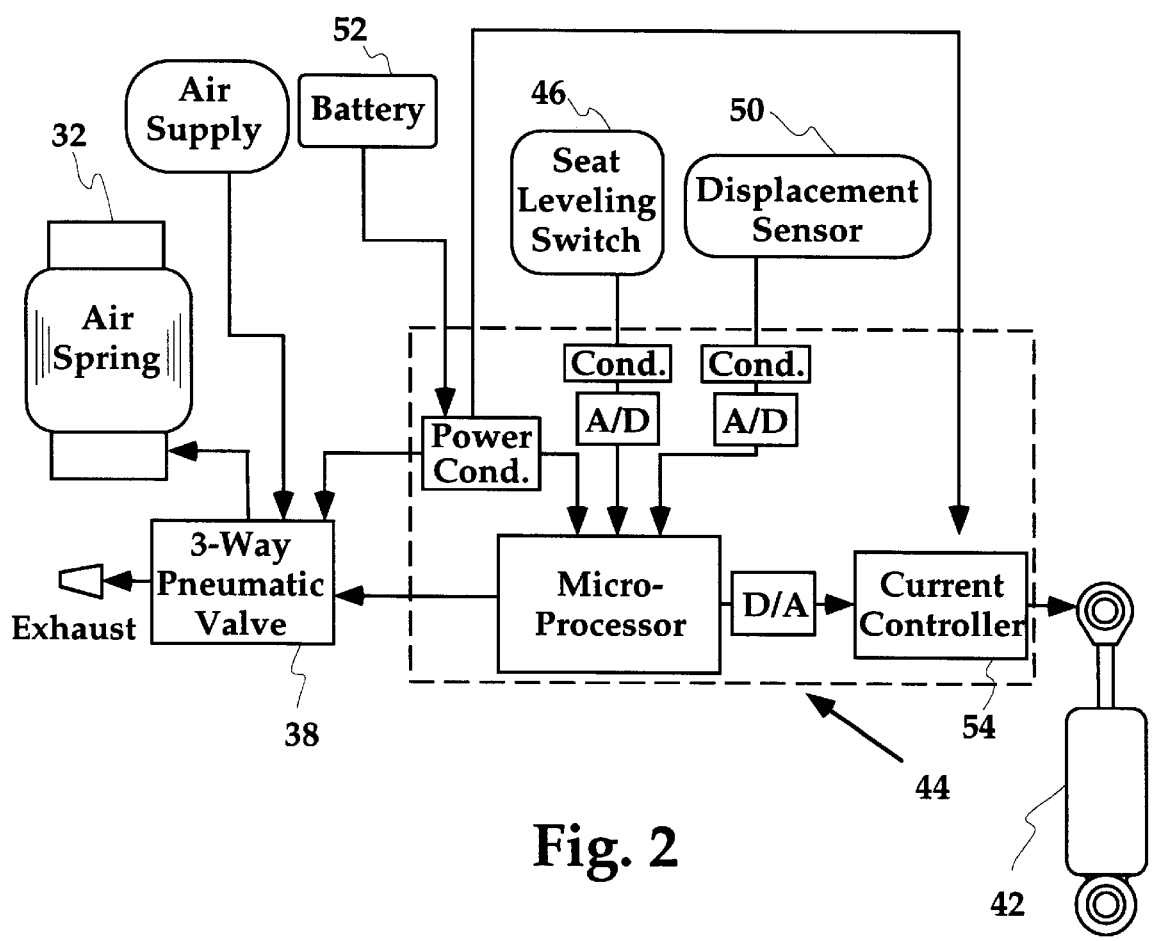
FIG. 2 is a schematic block diagram for the system of FIG. 1.

FIG. 2 is a schematic for the controller 44. An automotive battery 52 (preferably 12 or 24 volts) powers the controller 44 and provides power to a current controller 54 for controlling the controllable damper 42. The controller 44 includes a microprocessor connected to receive information from various sensors and other components, generally indicated by arrows pointing toward the microprocessor, and to command other components to act, generally indicated by arrows pointing away from the microprocessor. Thus, a signal from the seat leveling switch 46 to change the position of the seat is received and processed by the controller, and a signal is sent to the air spring valve 38 to change the air spring pressure accordingly.

As described in U.S. Pat. No. 5,652,704, the controller 44 receives data relating to the actual position of the seat, among other data, calculates the rate of change of position, and adjusts the damping level in the controllable damper 42. The damping level is a function of the actual position of the seat, the rate of displacement of seat, and the direction of the displacement.

A control system typically uses data relating to the kinematics of the suspension system to calculate the correct damping for sensed conditions. The locations of the end of travel positions, in the case of the seat, the upper and lower limits, must be known. From this information, the range of travel and the midpoint of the range may be calculated. The midpoint is often used as the neutral position of the seat, although the use of any point between the end limits may be used as a neutral position. Thus, the controller receives data from the position sensor and can determine where in the range of travel the seat is, the seat position relative to the end limits and the neutral position, and the direction of movement. Using time information, the rate of change of the seat position can also be calculated. In addition, the control system may be set up to increase the damping near the end of travel of the body to avoid end stop collisions at the end of travel allowed by the suspension. The damping is set to increase at a point a predetermined distance from each of the end stops at the ends of the travel limits. Thus, if the controller senses that the body is within either of the ranges defined by the end stops, a higher level damping routine is used, in addition to the routine used for normal damping when the seat is not in the end stop bands. The end stops are also used as limits for the range of movement within which the operator can adjust the seat, that is, so that the seat cannot be moved above the upper end stop limit or below the lower end stop limit.

A particular suspension system will have a range of travel related to the type of support system (for example, scissors mount), the stroke of the damper, and spring system (air spring) used. Other constraints could be imposed by the vehicle or apparatus in which the seat or cab is mounted. Obtaining the needed data before the present invention required manual collection and input of the data from the suspension system. When a controllable damper was included as original equipment, this resulted in extra labor cost. The difficulty is compounded when a system is installed on an existing truck or apparatus. In such cases, the installer may lack the needed expertise to mount the components and obtain the data points correctly, which may be detrimental to the performance of the unit. An additional advantage of the invention is that the data input devices are no longer needed, thus avoiding that expense.

Figure 3:
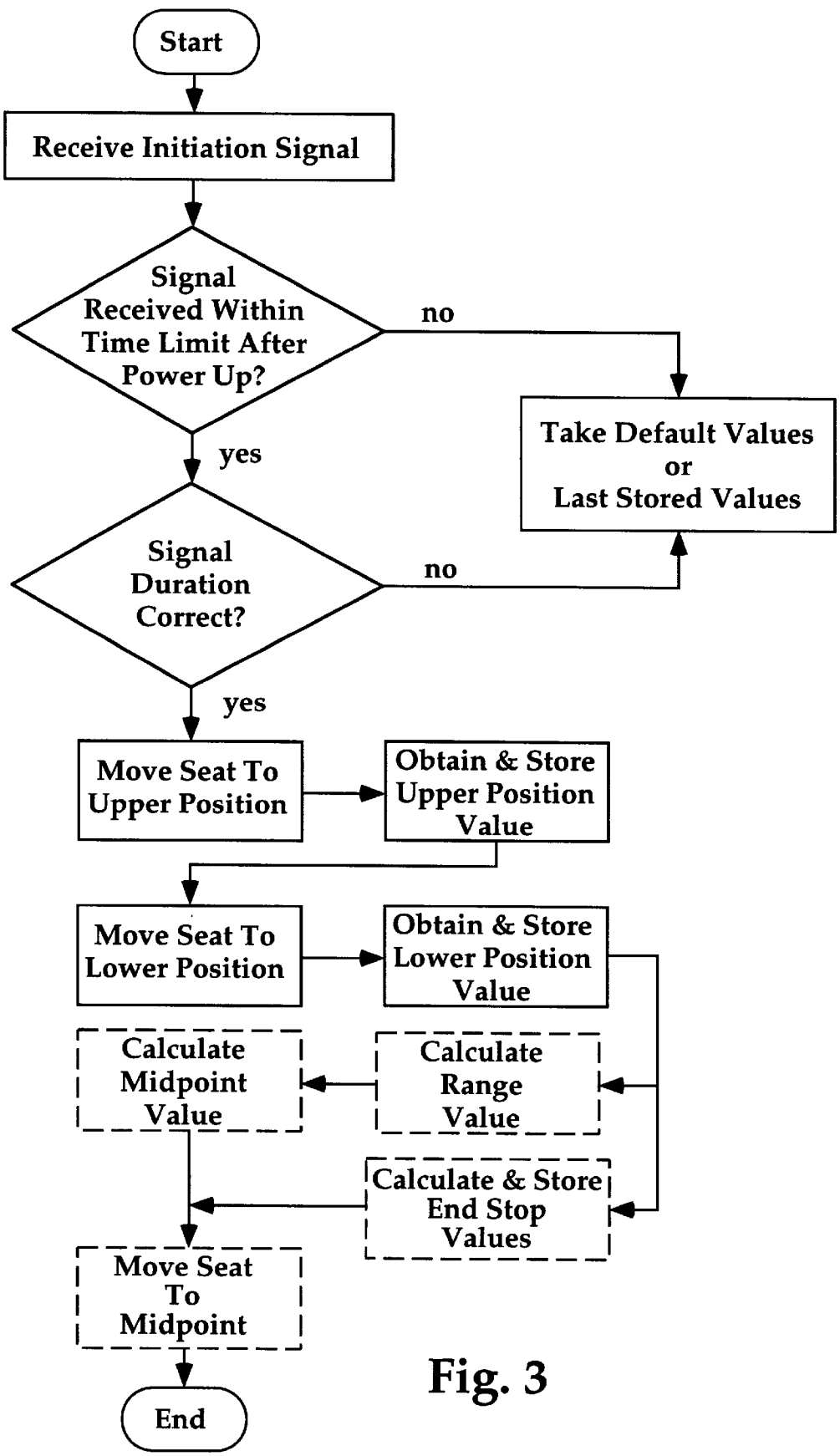
FIG. 3 is a flow diagram for an autocalibration method in accordance with the present invention.

A flow diagram of a method in accordance with the invention is shown at FIG. 3. After the system is powered, which occurs in a truck by starting the ignition, the calibration system looks for a calibration initiation signal that meets expected criteria as a check. According to the present embodiment, the system looks for an initiation signal within an initial time period, for example, within 45 seconds after power up. If the signal is received within the expected time, the system checks that the duration of the signal is correct, for example, at least 15 seconds long. If either the receipt of the signal is not within the initial time period or if the duration of the signal is not correct, the system will not calibrate, but will take default values or the most recently stored calibration values.

The calibration signal can be supplied to the controller in a number of ways. For example, the signal may conveniently be provided by holding down the seat leveling switch 46 in a predetermined position for a set length of time. Thus, additional hardware is not needed. By using a set signal duration, the system can differentiate between use of the seat leveling switch for simply adjusting the seat, and for sending a calibration command. Of course, other means for providing the initiation signal may be used, for example, a dedicated switch connected to the controller 44, or a separate device that communicates with the controller. The system can accordingly check that the signal was received from the appropriate source before beginning the calibration routine. By performing a check on the initiation signal, inadvertent re-calibration of the system is avoided.

With the operator preferably on the seat, the controller causes the seat to move to a first end position, for example, the upper limit of travel. To ensure that the upper limit position is reached, the controller holds the seat at this position for an extended period, for example twenty seconds. This allows the air spring 32 time to overcome friction in the support system members, and to allow the spring bladder to stretch to its full length. At the upper limit position the sensor 50 takes a position reading (P1) and stores this value. The controller 44 then automatically moves the seat to a bottom limit position, and again a position reading (P2) is taken and this value is also stored. Alternatively, this sequence may be reversed. Optionally, from these two values, the upper limit position and the lower limit position, the controller can determine a movement range, which is the arithmetic difference between the values (R=P1−P2). Preferably, the controller also calculates a midpoint position (Pm=P2+R/2). Once the midpoint position is calculated, the seat may be moved to the midpoint Pm. Optionally, the operator could move the seat to any desired position within the range of movement, which will be used as the neutral point for the damping system.

As mentioned above, end stop limits are typically used in controllable damping systems. According to the method, the end stop criteria are retrieved from a storage location and used to calculate the end stop limits. Preferably, the end stop limits are calculated as a fraction of the range of movement of the seat, so that an end stop limit is determined as a fractional distance from each of the upper and lower limit positions. It is preferred that the end stops be of unequal value so that the upper end stop limit and lower end stop limit do not have the same magnitude. For example, in testing with seats for trucks, it has been found advantageous to use an upper end stop limit of 0.30R from the top and a lower end stop limit of 0.20R from the bottom. Other end stop limits may, of course, be determined for a particular vehicle or apparatus. The end stops may optionally be predetermined, stored values that are retrieved during the calibration routine.

The values of the upper position, lower position, midpoint position, upper end stop limit and lower end stop limit are stored in a storage device, a memory, for access by the damping system. Once the data are stored, the calibration routine is complete, and the operation ends. The data remains in memory until the calibration is repeated. The calibration procedure may be performed once when the controllable damping system is first installed, and may be repeated when conditions change, for example, if the seat suspension structure is repaired or replaced.

The invention has been described in terms of preferred principles, method steps, and structure, however, the particular examples given are meant to be illustrative and not limiting. Substitutions and equivalents as will occur to those skilled in the art are included within the scope of the invention as defined by the following claims. In addition, although described with reference to a truck seat with a linear-acting controllable fluid damper, the invention can be used for any controllable damper system, such as a cab suspension system.

What is claimed is:

1. A method for auto-calibration of a controlled damper suspension system for a body supported on a frame, comprising the steps of:

a) receiving a signal to initiate calibration;

b) positioning the body at a first limit position;

c) determining a first limit value with a position sensor;

d) positioning the body at a second limit position;

e) determining a second limit value with the position sensor;

f) storing the first limit value and the second limit value for use by the controlled damper system; and g) controlling a damper using the first limit value and the second limit value.

2. A method for auto-calibration of a controlled damper suspension system for a body supported on a frame, comprising the steps of:

a) receiving a signal to initiate calibration;

b) positioning the body at a first limit position;

c) determining a first limit value with a position sensor;

d positioning the body at a second limit position;

e) determining a second limit value with the position sensor;

f) storing the first limit value and the second limit value for use by the controlled damper system; and g) determining a neutral position value between said first limit value and said second limit value and storing said neutral position value for use by the controlled damper system.

3. A method for auto-calibration of a controlled damper suspension system for a body supported on a frame, comprising the steps of:

a) receiving a signal to initiate calibration;

b) positioning the body at a first limit position;

c) determining a first limit value with a position sensor;

d) positioning the body at a second limit position;

e) determining a second limit value with the position sensor;

f) storing the first limit value and the second limit value for use by the controlled damper system; and g) calculating an end stop based upon at least one position limit value.

4. A method for auto-calibration of a controlled damper suspension system for a body supported on a frame, comprising the steps of:

a) receiving a signal to initiate calibration;

b) positioning the body at a first limit position;

c) determining a first limit value with a position sensor;

d) positioning the body at a second limit position;

e) determining a second limit value with the position sensor;

f) storing the first limit value and the second limit value for use by the controlled damper system; and g) determining a position range for the body as a difference between said first and said second limit values.

5. The method as claimed in claim 4, further comprising the steps of:
   a) calculating a first end stop limit value from said position range;
   b) calculating a second end stop limit value from said position range; and
   c) storing said first and second end stop limit values for use by the controlled damper system.

6. The method as claimed in claim 5, wherein the step of determining said first end stop limit value comprises determining a position a distance from said first limit position that is a first predetermined fraction of said position range and the step of determining said second end stop limit value comprises determining a position a distance from said second limit position that is a second predetermined fraction of said position range.

7. The method as claimed in claim 5, wherein said first end stop limit value is further distance away from a nearest of said first and second limit position than said second end stop limit value from the other of said first and second limit position.

8. A method for auto-calibration of a controlled damper suspension system for a body supported on a frame, comprising the steps of:
   a) receiving a signal to initiate calibration, the step of receiving a signal to initiate calibration including determining whether the signal meets a predetermined criterion;
   b) positioning the body at a first limit position;
   c) determining a first limit value with a position sensor;
   d) positioning the body at a second limit position;
   e) determining a second limit value with the position sensor; and
   f) storing the first limit value and the second limit value for use by the controlled damper system.

9. The method as claimed in claim 8, wherein said predetermined criterion is a time duration of said signal, and wherein said time duration of said received signal is measured and compared to a predetermined time duration.

10. The method as claimed in claim 1, wherein the step of positioning the seat at said first limit position includes commanding and holding the seat in said first limit position for a length of time sufficient to ensure that the seat reaches said first limit position.

11. The method as claimed in claim 1, wherein the step of positioning the seat at said second position includes holding the seat in said second limit position for a length of time sufficient to ensure that the seat reaches said second limit position.

12. A method for auto-calibration of a controlled fluid damper suspension system for a vehicle seat, comprising the steps of:
   a) receiving a signal to initiate calibration;
   b) positioning the seat at an upper limit position;
   c) determining an upper limit value with a position sensor;
   d) positioning the seat at a lower limit position;
   e) determining a lower limit value with the position sensor;
   f) determining a position range for the seat as a difference between said upper limit value and said lower limit value;
   g) calculating an upper end stop limit value from said position range value;
   h) calculating a lower end stop limit value from said position range value;
   i) storing said upper limit value, said lower limit value, said upper end stop limit value, and said lower end stop limit value for use by the controlled fluid damper suspension system.

13. The method as claimed in claim 12, further comprising the steps of determining a neutral position value between said upper limit value and said lower limit value, and storing said neutral position value for use by the controlled fluid damper suspension system.

14. The method as claimed in claim 12, further comprising positioning the seat at said neutral position.

15. The method as claimed in claim 12, wherein the step of determining said upper end stop limit value includes determining a position at a distance below said upper limit position that is a first predetermined fraction of said position range.

16. The method as claimed in claim 12, wherein the step of determining said lower end stop limit value includes determining a position at a distance above said lower limit position that is a second predetermined fraction of the position range.

17. The method as claimed in claim 12, wherein said upper end stop limit value is a different distance away from said upper limit position than said lower end stop limit value is from said lower limit position.

18. The method as claimed in claim 12, wherein the step of receiving a signal to initiate calibration includes determining whether a seat leveling switch has been held in an activated position for a predetermined length of time.

19. The method as claimed in claim 12, wherein the step of receiving a signal to initiate calibration includes determining whether the signal has been received within a predetermined time period after the system is powered.

20. A method for auto-calibration of a controlled damper suspension system for a body supported on a frame, comprising the steps of:
   a) receiving a signal to initiate calibration;
   b) positioning the body at a first limit position;
   c) determining a first limit value with a position sensor;
   d) positioning the body at a second limit position;
   e) determining a second limit value with the position sensor;
   f) determining a position range for the body as a difference between said upper limit value and said lower limit value;
   g) calculating a first end stop limit value from said position range value;
   h) calculating a second end stop limit value from said position range value, wherein said first end stop limit value is a different distance away from a first limit position than said second end stop limit value is from said second limit position;
   i) storing said first limit value, said second limit value, said first end stop value, and said second end stop value for use by the controlled damper system.

21. A method for auto-calibration of a controlled damper suspension system for a first body suspended relative to a second body, comprising the steps of:
   a) receiving a signal to initiate calibration;
   b) positioning the first body at a first limit position;
   c) determining a first limit value with a position sensor;
   d) positioning the first body at a second limit position;
   e) determining a second limit value with the position sensor;
   f) storing the first limit value and the second limit value for use by the controlled damper system; and
   g) controlling a damper using the first limit value and the second limit value.

* * * * *